INSTRUCTION COUNTER SYSTEM

Filed Nov. 14, 1961

3 Sheets-Sheet 1

INVENTOR
CHARLES R. HOLLERAN

BY Joseph J. Connerton
ATTORNEY

Dec. 22, 1964 C. R. HOLLERAN 3,162,841

INSTRUCTION COUNTER SYSTEM

Filed Nov. 14, 1961

3 Sheets-Sheet 2

Dec. 22, 1964 C. R. HOLLERAN 3,162,841

INSTRUCTION COUNTER SYSTEM

Filed Nov. 14, 1961 3 Sheets-Sheet 3

United States Patent Office 3,162,841

Patented Dec. 22, 1964

3,162,841

INSTRUCTION COUNTER SYSTEM

Charles R. Holleran, Ann Arbor, Mich., assignor to International Business Machines Corporation, New York, N.Y., a corporation of New York Filed Nov. 14, 1961, Ser. No. 152,306
10 Claims. (Cl. 340—172.5)

Figure 1:
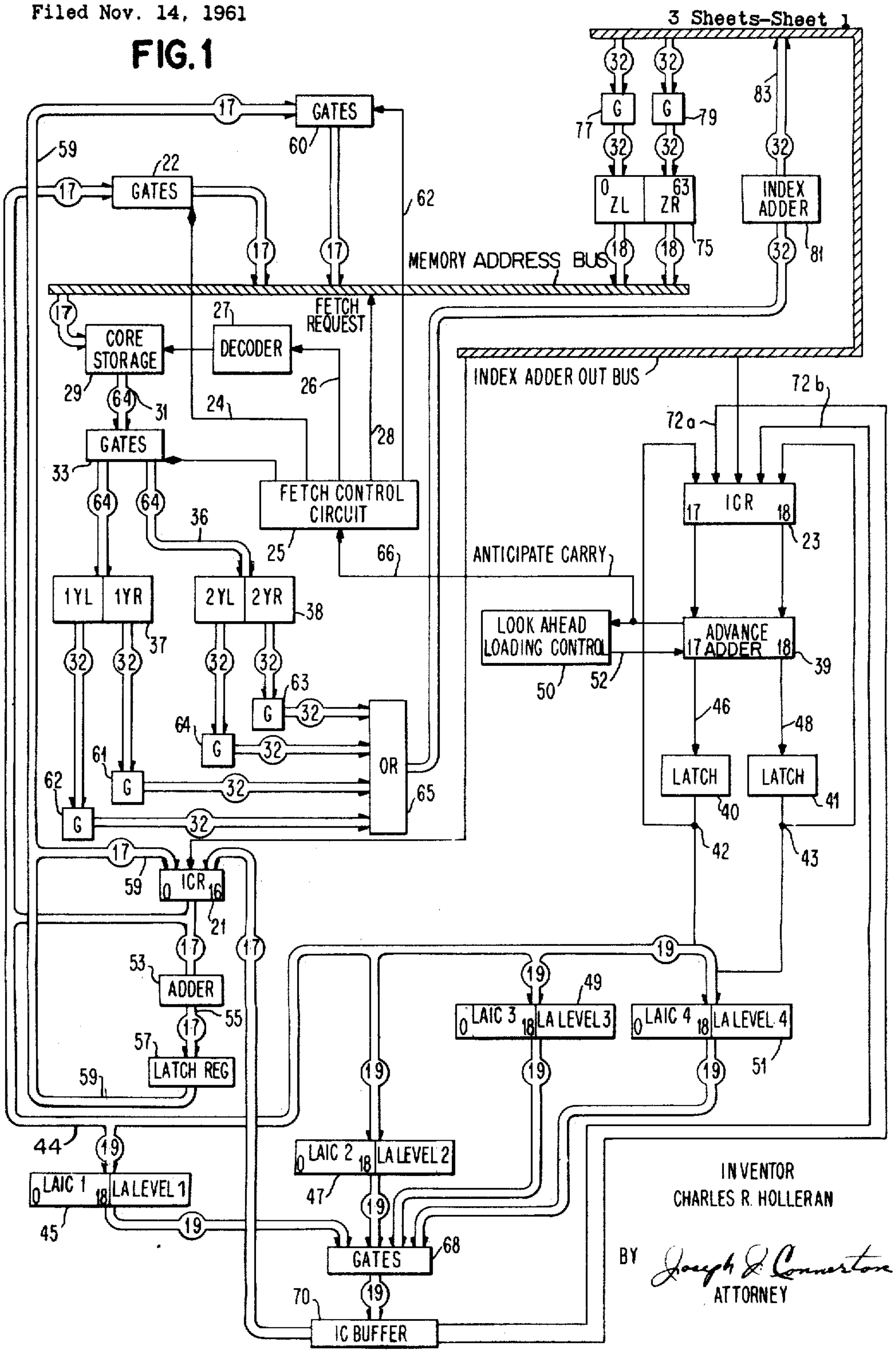

The present invention relates generally to electronic digital computers and similar types of apparatus and more particularly to an instruction control element.

Large scale digital computer systems include as one element of the system an Instruction Unit, which fetches instructions from memory, modifies or indexes them as required and either executes them or places them in storage preparatory to execution. In the prior art, the time required to process an instruction is defined as an Instruction cycle. One limiting factor in the speed of a digital computer system has been the time required to process these instructions in a serial fashion. In conventional synchronous computer systems, for example, the normal sequence relative to instruction processing is that instructions are fetched from memory, decoded, indexed and executed, so that only a single instruction is being processed at any given time. The present invention is directed to an instruction counting system which provides proper address identification in fetching instructions and in preparing them for processing while at the same time previously prepared instructions are being executed by the computer.

The present invention permits operating in an asynchronous overlapped mode and provides the means for recovery after interrupt, i.e., the means for resuming operations with the proper instruction should an interruption caused by an error or abnormal situation occur.

The counter system basically comprises first and second instruction registers, an adder associated with each register and associated control apparatus. Assuming a nineteen bit address, the first register (ICR) and associated adder (ICA) contain bits 0–16, the high order 17 bits, while the adder connected to the output of the register provides an output from positions 0–16 having a value one greater than the register output. The ICA output is latched and returned as a gated input to the ICR to advance ICR positions 0–16 to the adder output. The second ICR contains the two lower order bits of the address, positions 17, 18, the output of which is connected to a two bit adder designated advance adder that adds a bit in position 18 for half word instructions, and a bit in position 17 for full word instructions. ICR positions 17, 18 are also advanced by setting them to the advance adder output. Positions 17, 18 of the advance adder are stepped by controls and may be sequenced through two successive full word addresses or four successive half word addresses or combination thereof. Positions 17, 18 only affect positions 0–16 when there is a carry out of position 17. When a carry is to be made into ICR 0–16, an anticipated carry line to the control unit causes transfer of the contents of the ICA to the ICR. The advance adder output, together with the contents of the ICR, is transferred to lookahead so that along with each instruction stored in lookahead is the address of the succeeding instruction. Defining the first register (ICR) output and the associated adder (ICA) output as two addresses, each of these words can be modified by the second register and the advance adder to provide two additional full word addresses or four half word addresses for a total of four full word addresses or eight half word addresses which are simultaneously available.

Accordingly, a primary object of the present invention is to provide an improved counting system.

Another object of the present invention is to provide an improved counter enabling any one of a plurality of consecutive addresses to be simultaneously available.

A further object of the present invention is to provide an improved instruction counting system which enables recovery to the correct memory address when an interruption occurs.

Another object of the present invention is to provide an improved counting system comprising a register, an adder and associated control means whereby said register and adder outputs provide individual counts and said associated control means modifies said register and adder outputs to provide additional counts.

Still another object of the present invention is to provide an improved counter system used to control the fetching of signals from an addressable instruction storage device, the counter system including a register and adder interconnected in a closed loop and associated control means whereby the register and adder generate a first plurality of instructions and the control means generate a second plurality of instructions, the first and second plurality of instructions being simultaneously available for address identification of the fetched signals.

The foregoing and other objects, features and advantages of the invention will be apparent from the following more particular description of a preferred embodiment of the invention, as illustrated in the accompanying drawings.

In the drawings:

FIG. 1 illustrates in block form an instruction system including an instruction counter system according to the present invention.

Figure 2:
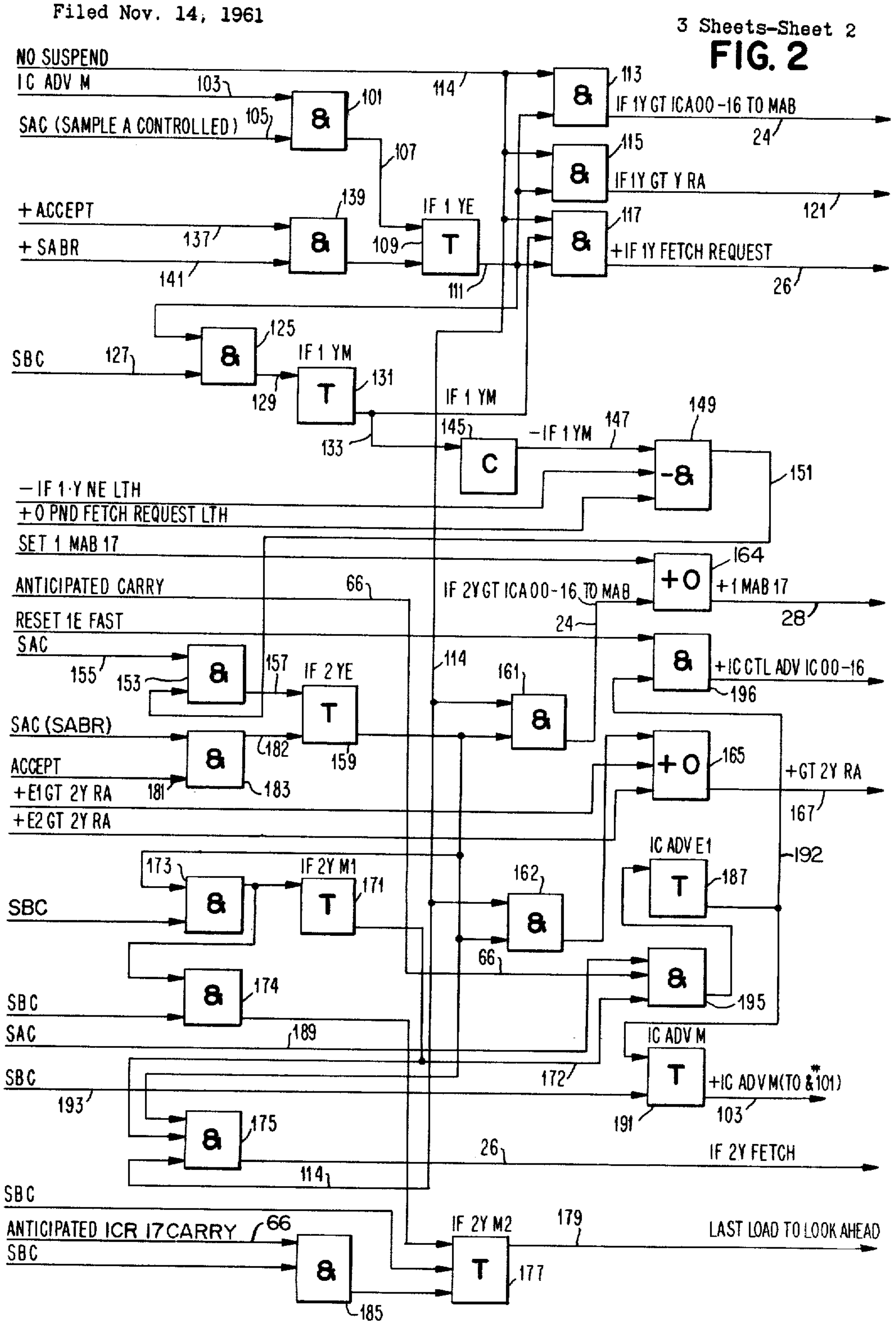

FIG. 2 indicates in logical form the instruction fetch control circuit used to control the ICR and ICA advance.

Figure 3:
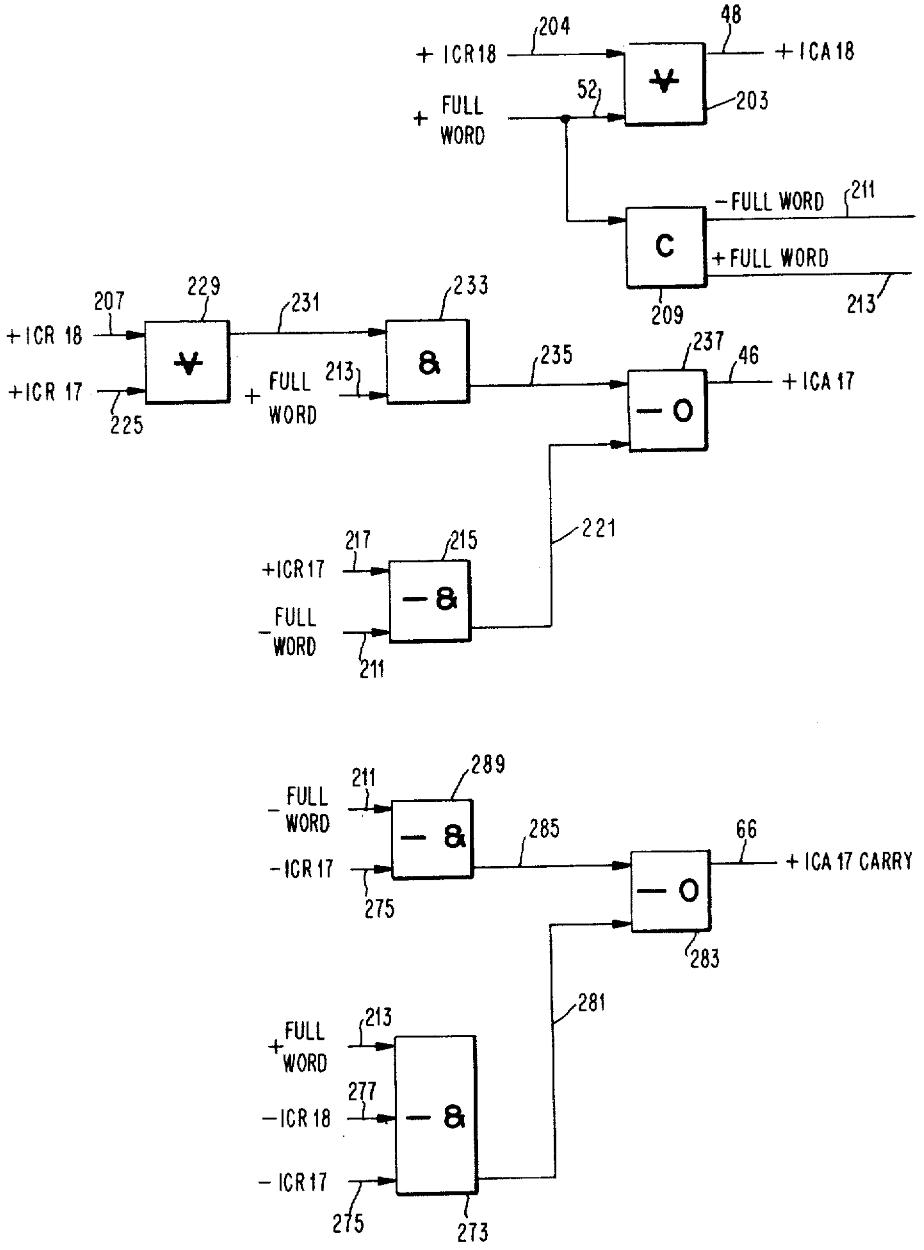

FIG. 3 illustrates in logical form the lookahead loading control circuitry to control the advance of bits 17, 18 of the Instruction Register.

Referring now to the drawings and more particularly to FIG. 1 thereof, it is assumed that the instruction counter registers 21 (bits 0–16) and 23 (bits 17, 18) are initially cleared to zero. While only a single physical instruction counter register is actually employed for bits 0–18, the register has been shown as divided into two logical registers since bits 17, 18 are independently controlled. Bits 0–16 relate to and advance under control of instruction fetching, while bits 17, 18 relates to and advance under control of lookahead transfers. Bits 0–16 of the ICR 21 are gated through gate circuits 22 conditioned by line 24 from the fetch control circuit 25 to the Memory Address Bus which in turn is connected to core storage memory 29. The zero condition in the registers identifies a memory address of zero. In response to a signal from Fetch Control Circuit 25 on line 26 labeled "fetch request," the instruction word in memory address zero of core storage 29 is read out from memory 29 and transferred through cable 31, gates 33 and cable 35 to a Register 37 designated 1Y having left and right sections designated 1YL and 1YR respectively. The memory 29 employed in the preferred embodiment is a core storage, the Memory Address Bus connected thereto identifying the location of the instruction. As soon as this word is placed in the 1Y register, the second fetch to the 2Y register is initiated, fetch control circuit 25 again gates positions 0–16 of the ICR 21 to the Memory Address Bus and transmits a "one" bit on line 25 to bit 17 of the Memory Address Bus. The one bit in position 17 identifies the Memory Address "one" which will be read out from memory 29 through cable 31, gates 33 and cable 36 into a register 38 designated 2Y also having left and right sections 2YL and 2YR respectively. The two registers 37, 38 are identical in physical hardware and are used alternately for receiving instructions from core storage 29. The 1Y and 2Y registers 37, 38 always receive instructions from even and odd core storage word addresses respectively. For purpose of the instant invention these registers may represent any conventional high speed registers which are well-known in the art.

In this manner the word in address zero is stored in 1Y register 37 and the word in address one stored in the 2Y register 38.

Two instruction buffer registers 37, 38 are used to achieve high speed instruction preparation. While only a single set of input gates 33 has been shown in the drawing for purposes of clarity, it will be understood that each of Y registers 37, 38 will have a complete set of input gates from core storage 29.

The Z register 75, shown as comprising a logically divided left and right half register, is the basic operating register employed in the Instruction Control environment herein described. Every instruction is transferred into this register from the Y registers for indexing, decoding, and lookahead loading. Its full word length accommodates full word instructions and allows maximum speed in half word instruction mode. All full word instructions appear straight, left to right, regardless of the positions the two halves occupied in the Y register or registers. The Z register contains 64 bit positions and is identical in construction to the Y registers. A set of gates shown as blocks 77, 79, each block comprising 32 gates, are used for gating the Index Adder Output Bus (IAOB) into the left and right half of Z register 75. Only the 18 bits pertinent to the instruction counter system are shown connecting the Z register 75 to the Memory Address Bus.

The output of the right and left halves of the 1Y and 2Y registers are connected through gates 61, 62 and 63, 64 respectively through Or circuit 65 to Index Adder 81, the output of which is connected via lines 83 to the Index Adder Out Bus (IAOB). These words will be transferred in half word units from the 1Y and 2Y registers to the Index Adder 81 in sequence. As shown in FIG. 1, gate circuits 77 and 79 complete the Y to Z transfer path through Index Adder 81. Since the arithmetic section of the computer is capable of operating at a higher rate of speed than the instruction element under certain conditions, it is desirable for maximum efficiency to have buffer storage devices to store instructions ahead of the instruction being executed at any given time. These buffer storage devices are designated as lookahead, and are divided into an address portion identified as LAIC, and an operand portion designated LA Level. For purposes of the present invention, the lookahead registers 45, 47, 49 or 51 are merely buffer storage devices for storing instruction addresses and operand levels prior to execution. The address portion of the registers is identified as LAIC 1, 2, 3 and 4, and the operand portion of the instruction is identified as LA Levels 1, 2, 3 and 4 respectively. The lookahead units and system are more fully described and set out in copending application Serial No. 73,005 (IBM Docket 7283), entitled "Data Processing System," filed December 1, 1960 by R. J. Bahnsen and J. F. Dirac and assigned to the assignee of the instant invention. However, for purposes of the instant invention, it should be noted that each operand portion of an instruction is combined with the address of the succeeding instruction.

The lookahead devices are loaded with an operand (LA Level) from the Z register and an address (LAIC) from the Instruction Counter Register 21 for bits 0–16 via cable 44 and the advance adder for bits 17, 18 under the control of lookahead loading control 50 via lines 42 and 43. For purpose of the present invention, the lookahead loading control 50, as more fully described hereinafter, identifies whether the instruction being loaded is a half or full word and applies a signal indicative of this designation to line 52. While a direct connection from ICR 21 to lookahead is shown in the interest of clarity, it will be understood that the output on cable 44 will be transferred to lookahead through a set of output gates conditioned by lookahead loading control 50. In a model of the invention as actually constructed, each lookahead device has an associated set of input gates permitting the lookahead to be loaded in sequence under control of lookahead loading control 50. However, these details are not shown since they are considered unnecessary to an understanding of the present invention. The digital value loaded from advance adder 39 will be advanced by a bit in position 17 for full word instructions or a bit in position 18 for half word instructions simultaneously with loading the instruction into lookahead. Thus the address of each instruction being loaded into lookahead will be advanced by a half or a full word from the true address of the instruction. The use of this technique in recovery from an interrupt will be fully described in greater detail hereinafter. At the same time, bits 17, 18 of advance adder 39 are also applied through latch circuits 40 and 41 to Instruction Counter Register 23 via lines 42 and 43 respectively to advance IC register positions 17, 18.

Returning to the fetching operation, words 0 and 1 have been gated from core storage 29 into the 1Y and 2Y registers 37 and 38 respectively by using the value in ICR 21 for the even fetch to 1Y and combining the ICR value with a bit generated for position 17 of the MAB for the odd fetch into 2Y. During fetching, fetch control circuit 25 provides address position 17 to the memory address bus via line 28. Since only full words are involved in the fetching operation, only 17 address positions are required. The zero instruction in 1Y has been transferred into the Z register, and the Instruction Unit is ready for the next fetch. Since the value in ICR 21 alone and modified has been utilized in fetching the first two instructions and ICR 21 has not been advanced, the address of the next instruction to be fetched is the address in the ICA 53. The latched adder output is connected through cable 59 to gate circuits 60, which are conditioned by the fetch control circuit 25 via line 62. The output of these gates is then applied via cable 64 to the Memory Address Bus 20. Thus the third fetch is generated by the output from the ICA, while the next or fourth fetch into 2Y is provided by the ICA output plus a bit generated for position 17 in the MAB 20 by line 28 from the fetch control circuit 25.

As more fully described hereinafter, on full word advance of bits 17, 18, whenever position 17 changes from a one to a zero on the next advance, an anticipated carry signal is generated on line 66 by the advance adder 39. This can occur in a full word advance from 1 0 to 0 0 with a carry of 1, or a half word advance from a 1 1 to a 0 0 with a carry of 1. This signal is applied via line 66 labeled "anticipate carry" to the fetch control circuit 25 which causes the fetch control circuit 25, to gate the latched ICA output into ICR 21 and thereby advance the ICR. The anticipate carry signal is also applied to lookahead loading control 50 to prevent transferring the 0–16 positions of ICR 21 to lookahead until ICR 21 has been advanced by the ICA. While it has been omitted from the drawing for the sake of clarity, the input to ICR 21 from ICA 53 is connected through a set of gates which are controlled by the fetch control circuit 25. Advancing ICR 21 causes the ICA 53 to advance and provide the addresses for the next two fetches, while the ICR output is used as heretofore described for lookahead loading. Thus each advance of the ICR is preceded by generation of the anticipated carry signal by advance adder 39.

When the level of the instruction containing the ICR value is delivered to an execution device such as an arithmetic unit not shown to be executed, the instruction address in the associated lookahead instruction counter (LAIC), which represents the address of the next instruction, is transferred through gates 68 to the Instruction Counter Buffer (ICB) 70. Thus during execution of any given instruction, the IC Buffer contains the address of the next instruction to be executed. Accordingly, whenever an interrupt occurs, the information in the IC Buffer indicating the recovery address can be transferred to the ICR through cable 71 and lines 72*a*, 72*b* so that the computer can resume fetching of instructions with the correct address in the ICR, i.e., the address immediately following the instruction that was interrupted. This transfer could be originated by a control signal as part of the recovery operation after interrupt.

The following indicates the range of four full words covered by the Instruction Counter system, defining the address of ICR position 0–16 as address N:

ICR 0–16 fetch control supplies 0 to position 17 N.
ICR 0–16 and fetch control supplies 1 to position 17 *N*+1.
ICA 0–16 and fetch control supplies 0 to position 17 *N*+2.
ICA 0–16 and fetch control supplies 1 to position 17 *N*+3.

By employing bit 18 in the ICR, a range of eight half word instructions is readily available, since information in the 18th bit of a binary sequence is half the value of information contained in bit 17. Bits 17, 18 of ICR 23 have a separate advance control from bits 0–16 of ICR 21 because the former require advancing controlled by lookahead transfers, and the latter require advance under control of instruction fetching. However, the two advances must be interlocked because ICR positions 0–16 are used both for loading lookahead and as a source of the IC adder value for fetching. This interlock prevents the advance of ICR positions 0–16 until all values of ICR 17, 18 have been exhausted.

The gates and registers shown in FIG. 1, i.e., the gates 60 and 22 and registers 75 essentially consist of circuits that permit Oring the output of several registers or fields on one set of bus lines so that the bus can, for instance, handle all addressing for a certain unit. The MAB, for example, handles all core storage addressing. The IAOB is a 32 bit data bus from the Index adder 81 output which goes to the input of the Instruction registers 21 and 23, the Z register 75 and contains information in the form of transfer data or data resulting from an index adder operation such as address modification.

The above description defines in general the environment of the present invention and illustrates the utility of a counting system able to generate and make available a number of successive instructions for asynchronous processing.

The operation of the instruction fetch control circuit 25 with respect to the manner in which it controls the Instruction Counter is illustrated in FIG. 2. Referring to FIG. 2, there is illustrated a logical arrangement of the fetch control circuit 25 associated with the instruction fetching loop. In the ensuing description, the terms up and down are used interchangeably with positive and negative to designate positive and negative transitions utilized as inputs to the logical element employed in the preferred embodiment. Only those elements which perform a logical function will be illustrated, amplifiers, drivers, inverters, etc., being omitted from the drawings and from the description unless deemed pertinent. In the ensuing logical diagrams there are certain conventions employed which are familiar to certain of those skilled in the art. Additional information concerning these conventions are as follows.

In the block diagram figure of the drawings arrowheads are employed to indicate a circuit connection, energization with a transition signal and the direction of control. Bold face character symbols appearing within a block symbol identify the name of the circuit represented, i.e., T represents a trigger, & a logical And Circuit, Or a logical Or circuit, etc., and such circuits are further identified as being positive or negative. While the invention is not limited to any specific logic, the logic employed in the preferred embodiment herein described is current mode transistor logic which is characterized by the use of small voltage swings that switch well defined currents from one part of a circuit to another. Two outputs are usually available from the current switching logic circuits, an in phase output and an inverted or out of phase output. For additional details concerning current mode transistor logic, reference is made to U.S. Patent 2,964,652 to Yourke, filed November 15, 1956 and issued December 13, 1960 and assigned to the assignee of the instant invention.

The normal circuit for the instruction fetch loop, started immediately after an advance, finds And circuit 101 conditioned by the output of the IC Advance trigger, discussed subsequently, on line 103 labeled ICADVM. When a Sample A Controlled (SAC) pulse is applied via line 105, the resulting output from And 101 on line 107 turns on the Instruction Fetch 1Y Execute trigger 109 labeled 1F1YE. The Sample A Controlled (SAC) and Sample B Controlled (SBC) pulses are the basic timing pulses of the machine, the terms A and B designating alternate pulses which may be provided by a conventional timing pulse generator. Likewise the SABR pulse is a timing pulse originating in the clock distribution area of the system. The output of trigger 109 is connected via line 111 to And circuits 113, 115 and 117. The second input to And circuits 113, 115 and 117 is a No Suspend signal on line 114 used to deactivate the fetch control circuit in the case of special instructions such as branch. The "No Suspend" signal normally conditions the associated And circuits 113, 115 and 117.

When trigger 109 is turned ON in the above described manner, the signal on line 111 allows the output of And circuit 113 to rise, whereby the resulting output signal on line 24 (FIG. 1) transfers ICR positions 0–16 to the Memory Address Bus. The output from And circuit 115 causes the storage bus to transfer the word to one of the Y registers in the Instruction unit. Output line 121, "1F1YGTYRA" is sufficient by itself to have the word returned to the 1Y Register. The signal on line 121 sets a trigger, the condition of which indicates that the word is to be transferred from MAR to the 1Y Register. The details of memory readout controls to the Y Register are shown only schematically since the specific details thereof are well known in the art and considered an unessential detail of the present invention. It will be evident from the preceding description that position 17 to the Memory Address Bus is not necessary on even fetches because the 1Y Register only receives even-numbered instructions words.

When trigger 109 is turned ON, the resulting output also conditions And circuit 125, so that on the next SBC timing pulse on line 127, the output on line 129 turns on trigger 131, which in turn applies the second input via line 133 to And circuit 117, the output of which indicates the specified fetch request +1F1Y Fetch Request. The instruction fetch operation is now complete as far as the instruction counter system is concerned because the core storage word address, and the return address to which the word is to be returned (1Y Register) have been provided and a request has been sent to the storage bus for use of their facilities. These conditions remain static until the fetch request is accepted by the storage bus, and a line 137 labeled "+accept" comes back to condition And circuit 139, causing trigger 109 to be turned off on the next A or B sample pulse (SABR) applied via line 141 to And circuit 139.

The next fetch operation to the 2Y Register 38 is initiated. This can be done after the 1F1YM trigger 131 comes on and the 1F1YE trigger 109 turns off through the following circuit. When trigger 131 is turned ON, the resulting output on line 133 is converted to a signal of opposite polarity through convert unit 145, the output line 147 of which is applied to —And circuit 149, the resulting output line 151 being in turn applied to condition And circuit 153. Upon receipt of the next SAC pulse on line 155, the resulting output of And circuit 153 on line 157 turns trigger 159 labeled 1F2YE On. Trigger 159 performs essentially the same functions for the 2Y register as trigger 109 performs for the 1Y register, namely, gating the ICA 0–16 address to the MAB through And circuit 161 and the Instruction Unit Y return address through And circuit 162. The output of And circuit 161 is shown as line 24 in FIG. 1. In addition, because the 2Y Register always receives odd numbered instruction words from core storage, Or circuit 164, connected to the output of And circuit 161, provides a "1" to Memory Address Bus position 17 via line 28 (FIG. 1). The output of Trigger 159 is connected to the input of And circuit 162, the output of which is connected as an input to Or circuit 165. A signal generated from Or circuit 165, on line 167 labeled "—GT2YRA" indicates this word is to be returned to the 2Y Register.

At SBC time, trigger 171 labeled 1F2YM1 is turned on through And circuit 173. With triggers 159 and 171 both ON and no suspend, the 1F2Y fetch request on line 26 is brought up through And circuit 175, which has its inputs from the trigger outputs. As long as the fetch is not suspended, trigger 177 is turned on at the same time as trigger 171 through And circuits 173 and 174. Trigger 177 allows the last load to lookahead to take place, since, as previously described, the anticipated carry on line 66 from the advance adder 39 blocks the lookahead loading until ICR 21 has been advanced by ICA 53. The last load to lookahead line 179 comprises the input to an interlock circuit, which permits the last lookahead level of a given instruction to be loaded when other prerequisite conditions exist. When there is an anticipated ICR 17 carry, the line 179 is down and allows the last level of lookahead to be loaded. The specific details of the last load interlock have not been illustrated, since they are not considered necessary to an understanding of the present invention.

Trigger 159 is turned off by the signal on line 182 which is generated by the accept signal on line 181 and a SAC pulse to And circuit 183. Trigger 177 is turned OFF by the output from And circuit 185, which in turn is controlled by the anticipated carry line 66 and a SBC pulse.

If the interlocking of the advance of ICR positions 0–16 by the carry out of ICR 17 is disregarded for the moment, trigger 187 labeled ICADVE1 is turned on by And circuit 195, which in turn is controlled by a SAC pulse on line 189, an anticipated carry signal on line 66 and output line 172 from trigger 171. The ICADVM trigger 191, which is conditioned by output 192 from trigger 187, is turned on with the next SBC pulse on line 193. Trigger 187 permits advancing ICR 0–16 through And circuit 196, and the advance must be done before the next instruction fetching loop may be started. Output 103 of trigger 191 conditions the turn on of the 1F1YE trigger 109 for the start of the next instruction fetch loop through And circuit 101 as previously described.

The above description illustrates the manner in which the Instruction Counter is used for fetching instructions. Two fetches are made before the ICR 21 is advanced. Advance is accomplished by gating the output of the adder into the ICR, thereby advancing the ICR. The ICA will likewise advance by two words, thereby permitting two more instructions to be fetched. On the first fetch following an advance, the fetch control circuit supplies a zero to position 17 of the register, causing an even word to be fetched. On the second fetch, the control supplies a one to position 17, causing the next higher odd word to be fetched.

As previously indicated, whenever an interrupt occurs, it is necessary to have the instruction address of the next instruction to be executed stored in lookahead and available for recovery, since all buffering may be destroyed by the interrupt. Whenever a level of lookahead is loaded with an instruction, lookahead gates IC register bits 0–16 into the designated level. The instruction address to be loaded into lookahead, as far as bits 0–16 are concerned, is the unadvanced value from ICR 21 if there is no anticipated carry out of the positions 17 of advance adder 39. If there is an anticipated carry, the advanced instruction counter address for bits 0–16 must be loaded. Because only the IC Register feeds lookahead, the advanced value is not available until the fetch control circuit 25 permits the advance. Thus the advance of bits 0–16 of IC Register 21 must take place after the anticipated carry out of position 17 has been detected but before or during the load of the level.

While certain instructions use the output from IC register 23 for loading bits 17, 18 into lookahead, the values used for loading bits 17, 18 in the lookahead instruction counter register are generally gated to lookahead from the IC advance adder 39 and will be so assumed in the description of the preferred embodiment. The advance adder 39 which provides the advanced output of IC positions 17, 18 is a two position adder with outputs according to the following table. The full or half word instruction being advanced is the instruction being executed by the Instruction System.

| IC Register | | Advance Output—Half Word | | | Advance Output—Full Word | | |
|---|---|---|---|---|---|---|---|
| 17 | 18 | 17 | 18 | Anticipated Carry Bit 17 | 17 | 18 | Anticipated Carry Bit 17 |
| 0 | 0 | 0 | 1 | 0 | 1 | 0 | 0 |
| 0 | 1 | 1 | 0 | 0 | 1 | 1 | 0 |
| 1 | 0 | 1 | 1 | 0 | 0 | 0 | 1 |
| 1 | 1 | 0 | 0 | 1 | 0 | 1 | 1 |

The advanced output is sent to lookahead when loading the last level of an instruction. When there is no carry-out of position 17, using the advance counter output from positions 17, 18 and IC Register positions 0–16 to form the 19 bit IC address always gives the address of the instruction following the one being loaded. If there is a carry out of position 17, the advance of ICR 21 must take place before or during the load to propagate the carry into positions 0–16. Then the combination of ICR 0–16 following the advance and the advanced output of IC positions 17, 18 once again combine to form the address of the instruction following the one being loaded.

Referring now to FIG. 3, there is illustrated in block logic form the advance counter circuit shown as block 39 in FIG. 1. As in FIG. 2, only those circuits providing a logical function will be shown and described, since non-logical devices are circuit design or load considerations not pertinent to the present invention.

As an illustration of advance circuit operation, consider the condition of advancing a half word instruction where the bits 17, 18 of ICR 23 are initially in the zero condition. Under this condition to provide the correct LAIC register information, the original address must be altered by adding a bit into position 18 while maintaining position 17 unaltered. Under this condition Exclusive Or circuit 203 has as its inputs the line 52 (FIG. 1) labeled FULL WORD which is down because it does not specify a full word transfer and line 204 labeled ICR 18, which is down because there is no bit in position 18. The output of Exclusive Or circuit 203 indicated as the line 48 (FIG. 1) will accordingly be positive indicating a bit in ICA 18. This is latched by latch 41 shown in FIG. 1 and gated to lookahead as ICA 18. Input line 52 is also connected directly to a convert block 209 which provides a negative output on line 211 and a positive output on line 213. Under the conditions thus far described, the first input to negative And circuit 215 from full word line 211 is negative and the second input on line 217 labeled ICR 17 is likewise negative so that the resulting negative output provided on line 221 is applied to negative Or circuit 237. The input on line 225 labeled ICR 17 to Exclusive Or *circuit* 229 *is* negative because there is a zero in bit position 17. The second input on line 207 labeled +ICR 18 to Exclusive Or circuit 229 is likewise negative, since ICR position 18 is a zero. The resulting two negative inputs to Exclusive Or circuit 229 provide a positive output on line 231 which is applied as one input to negative And circuit 233. The second input to negative And circuit 233 is the out of phase output of convert block 209 on line 213, which, as above indicated, is positive. Under this condition the resulting positive output from —And circuit 233 on line 235 is applied as one of the inputs to —Or circuit 237, the second input being the negative output from —And circuit 215 on line 221. Since a negative and positive signal are applied to —Or circuit 237, the resulting positive output on line 46 is applied to a latch circuit 41, shown in FIG. 1, which is gated to lookahead for lookahead loading. The final condition to be satisfied in the example under consideration is that no carry be generated on the anticipated carry line 66 labeled +ICA 17 carry, since changing 0 0 to 0 1 would not create a carry from position 17. There are three positive inputs applied to negative And circuit 273. The first input is the +full word output line 213 from convert circuit 209 which is positive, the second input is the positive signal on line 275 labeled —ICR 17 corresponding to but out of phase with the input signal on line 217, the third input on line 277 is a positive signal corresponding to but out of phase with line 204 labeled ICR 18. Under this condition an in phase positive output from —And circuit 273 is provided on line 281 which is connected to negative Or circuit 283. The other input on line 285 to —Or circuit 283 is the positive signal derived from negative And circuit 289. The out of phase output from negative Or circuit 283 on line 66 is a negative signal which is applied to a latch circuit, not shown, indicating no ICA 17 carry. Since the carry advance occurs only when a positive signal is provided on line 66, all the conditions for the desired operation, that is, adding a one to position 18, maintaining bit 17 in its initial condition and preventing a carry to position 0–16 of the ICR register have been fulfilled.

As a second example of the operation of the Instruction Counter and Advance Control, consider the situation where a one bit is available in positions 17, 18 and it is desired to advance a full word instruction. At the completion of this operation, bit 18 would remain a one, bit 17 would be a zero and a carry would be generated from bit 17 to ICR bits 0–16.

The circuit to provide a one bit for the LAIC register position 18 is as follows. Both inputs to Exclusive Or circuit 203 are up, so the out of phase output on conductor 48 is positive. Conductor 48 is connected to latch circuit 41, FIG. 1, where it is latched and gated to lookahead LAIC —18 as a one bit.

The circuit to provide a zero (no bit) in position 17 is as follows. The input on line 52 (FULL WORD) to convert circuit 209 is up. The negative out of phase output on line 211 from convert circuit 209 is applied to negative And circuit 215. The other input to —And circuit 215, comprising the ICR 17 line 217, is positive, resulting in a positive output on line 221. The output of —And circuit 233 is also positive because the positive in phase signal on line 213 from convert circuit 209 comprises one of the inputs to —And circuit 233. Since —And circuits 215 and 233 are effectively deconditioned, i.e., provide positive outputs, the out of phase output from —Or circuit 237 on line 46 *is* negative. Line 46 is connected to latch circuit 40 shown in FIG. 1, the output of which is gated to lookahead register 17.

The final condition to be satisfied is that a carry be provided into ICR 0–16, indicated by a positive signal on line 66. The input to —And circuit 289 on line 211 from convert circuit 209 is negative, and the second input from line 275 (—ICR 17) is also negative, since the IC Register is being advanced one full word and bit 17 is a one. Accordingly, a negative output is provided on line 285 to negative Or circuit 283, which in turn provides a positive output on the anticipated carry line 66 as required.

Accordingly, the present invention provides a counter unit enabling any one of a plurality of successive counts to be simultaneously available, with the inherent advantage deriving from overlapped operation which this facility permits. An additional advantage is derived from the incorporation of a recovery mechanism which permits the instruction unit to resume fetching with the correct instruction after an interruption has occurred.

While the invention has been particularly shown and described with reference to a preferred embodiment thereof, it will be understood by those skilled in the art that various changes in form and details may be made therein without departing from the spirit and scope of the invention.

What is claimed is:

1. An instruction counter system for sequentially generating a plurality of counts representing instructions which are simultaneously available comprising a register, means for entering a first count in said register, an adder connected to the output of said register to provide a second count which is a predetermined increment higher than said first count and control means for generating third and fourth counts, said control means including means for expanding the word length of said first and second counts by adding predetermined increments to the low order positions thereof whereby a plurality of instruction counts are simultaneously available.

2. An instruction counter system as claimed in claim 1 including output storage means for storing each of said plurality of counts with an associated instruction, said counts identifying the address portion of the next consecutive instruction word.

3. An instruction counter system as claimed in claim 1 including means interconnecting the output of said adder to the input of said register to form a closed loop count generating system.

4. An instruction counter system as claimed in claim 3 wherein said means interconnecting the output of said adder to the input of said register comprises a latch register circuit.

5. An instruction counter system adapted to provide a plurality of instructions having consecutive addresses for subsequent execution by a data processing system comprising a register, means for transferring data from the memory unit of said data processing system to said register, said data corresponding to the address portion of a first instruction and the high order address portion of a second instruction, an adder connected to said register to provide a third instruction having an address which is a predetermined increment higher than said first address and the high order address portion of a fourth instruction and means for modifying said first and third instructions in said register and said counter by predetermined increments to provide second and fourth instructions whereby a plurality of instructions having consecutive addresses are simultaneously available.

6. An instruction counter system for providing a plurality of instructions having consecutive addresses which are simultaneously available for utilization comprising a register for providing a first address and the high order portion of a second address, an adder connected to said register to provide a third address and the high order portion of a fourth address, said third address being at all times a predetermined increment higher than said first address, means for completing said second and fourth addresses by providing the low order portion thereof, means interconnecting said register and said adder in a closed loop circuit and means for stepping said register and said adder whereby a plurality of instruction addresses are sequentially generated.

7. An instruction counter system as claimed in claim 6 wherein said means for providing the low order portion of said second and fourth addresses comprises a bit generator which expands the word length in said register and said adder by a single bit.

8. An instruction counter system as claimed in claim 6 wherein said means interconnecting said adder to said register in said closed loop circuit comprises a latch register circuit interconnecting the output of said adder to the input of said register and adapted to enter the contents of said adder into said register during cyclic operation thereof.

9. An instruction counter system for providing address identification of instruction signals fetched from an addressable storage device comprising a plurality of output buffer registers for storing signals representing instructions having consecutive addresses, a register for retaining signals representative of the address of a first instruction, an adder connected to said register for generating signals identifying the address of a second instruction, means for generating third and fourth instruction addresses by adding a single bit to said first and second addresses, means for storing the addresses so generated in said plurality of output buffer registers and means for forming a closed loop system between said register and said adder.

10. An instruction counter system for providing address identification of instruction signals fetched from an addressable storage device and providing the address of the recovery instruction in the event of interrupt comprising a register for storing a first count, an adder connected to said register for generating a second count, said second count being a predetermined increment higher than said first count, control means for modifying said first and second count to provide a plurality of counts identifying consecutive instruction addresses, means for interconnecting said register and adder in a configuration for continuous cyclic operation, a plurality of buffer storage devices, means storing an instruction and the address of the next instruction in each of said buffer storage devices, means responsive to the execution of each of said instructions for storing the address of next instruction and means transferring said last named instruction to said register for recovery purposes in the event of an interrupt.

References Cited in the file of this patent

UNITED STATES PATENTS

| | | |
|---|---|---|
| 2,959,351 | Hamilton et al. | Nov. 8, 1960 |
| 3,015,441 | Rent et al. | Jan. 2, 1962 |
| 3,022,003 | Garrison et al. | Feb. 20, 1962 |
| 3,094,610 | Humphrey et al. | June 18, 1963 |